US009147325B2

(12) United States Patent
Agrawal et al.

(10) Patent No.: US 9,147,325 B2
(45) Date of Patent: Sep. 29, 2015

(54) EMERGENCY COMMUNICATION SYSTEM

(75) Inventors: Vishal Agrawal, Independence, MO (US); Gary Bond, Maitland, FL (US); Paul Kohne, Oak Grove, MO (US); Shawn Thompson, Independence, MO (US); Kevin Montgomery, Lees Summit, MO (US); Sean Titus, Independence, MO (US)

(73) Assignee: Fike Corporation, Blue Springs, CO (US)

( * ) Notice: Subject to any disclaimer, the term of this patent is extended or adjusted under 35 U.S.C. 154(b) by 0 days.

(21) Appl. No.: 13/536,518

(22) Filed: Jun. 28, 2012

(65) Prior Publication Data

US 2014/0003586 A1 Jan. 2, 2014

(51) Int. Cl.

| | |
|---|---|
| ***H04M 3/16*** | (2006.01) |
| ***G08B 3/10*** | (2006.01) |
| *G08B 7/06* | (2006.01) |

(52) U.S. Cl.
CPC .. *G08B 3/10* (2013.01); *G08B 7/066* (2013.01)

(58) Field of Classification Search
CPC ... H04M 11/045; H04M 11/04; H04Q 3/0029
USPC ............ 379/37; 381/77; 704/274; 340/573.1; 455/11.1
See application file for complete search history.

(56) References Cited

U.S. PATENT DOCUMENTS

| | | | | |
|---|---|---|---|---|
| 3,656,158 | A * | 4/1972 | Goodwater | 340/507 |
| 3,794,765 | A * | 2/1974 | Goodwater | 381/77 |
| 4,589,132 | A * | 5/1986 | Botbol et al. | 704/274 |
| 5,689,802 | A * | 11/1997 | Luzzatto | 455/11.1 |
| 7,675,423 | B2 * | 3/2010 | Boling et al. | 340/573.1 |

* cited by examiner

*Primary Examiner* — Fan Tsang
*Assistant Examiner* — Van D Huynh
(74) *Attorney, Agent, or Firm* — Hovey Williams LLP

(57) ABSTRACT

An emergency communication system that is capable of broadcasting a live message to a specific zone of a protected structure, recording the live transmission, and repeating the recorded message to the same protected zone. In certain embodiments configured to protect multiple zones, the system further permits broadcast of a second live message to another zone of the structure, recording the second live broadcast, and repeating the second recorded message in the same zone to which the message was broadcast live. The system includes hardware such as a processing element and speaker assemblies and a computer program for instructing the processing element to carry out the transmission, recording, and re-broadcasting of messages through the speaker assemblies.

19 Claims, 3 Drawing Sheets

EMERGENCY COMMUNICATION SYSTEM

BACKGROUND OF THE INVENTION

1. Field of the Invention

The present invention is generally directed toward an emergency communication system that may be installed within a protected area of a protected premises, such as a multi-level building, a sprawling single level building, or multi-building campus. The emergency communication system permits system operators to broadcast live messages to individual zones within the protected area, record the live messages while they are being broadcast, and then automatically replay the recorded messages. Thus, the system eliminates the need for a system operator to continuously broadcast the same live message to particular zones of the protected area.

2. Description of the Prior Art

It is very common for modern commercial or public buildings to possess some type of alarm system capable of notifying occupants of a potentially dangerous situation, such as a fire. In the past, such systems upon actuation emitted a siren, bell, or other type of alarm that alerted building occupants to evacuate the structure. Typically, actuation of the alarm indicated the presence of a fire in the building. However, the alarm could also be actuated for other reasons such as inclement weather, hazmat incidences, or earthquakes. In addition, actuation of the alarm system could be accidental, i.e., a false alarm. Thus, it was left up to the building occupants to decipher the intended meaning for the signal. This would often lead to the assumption that the alarm was false and the occupants would not take the required precautionary action.

Over time, emergency communication systems were developed to permit broadcast of voice messages across a public announcement system installed within the building. Some systems permitted emergency responders or building personnel to broadcast a live or a pre-recorded page explaining the nature of the emergency and provide instructions to the building occupants. The message could even be directed to particular portions of the structure affected by the emergency condition as opposed to the entire building. With respect to systems employing pre-recorded messages, a primary shortcoming was that only those emergency situations that were likely foreseeable could be planned for and an appropriate message designed. If a pre-recorded message option was not appropriate for a particular situation, an emergency responder would have to live broadcast the information that the building occupants needed to hear. Further, the live instructions broadcast by the responder may even countermand a pre-recorded message as the responding personnel assess and react to the actual and developing conditions in real time. In this regard, the live announcements are usually the most important and are given the highest priority in the configuration of the systems.

Typically, upon initiation of a live page by the system operator using a paging microphone or firefighter's telephone, the live audio message is immediately broadcast over the system speakers. Once the page is completed, the system returns to its normal, automatic operational state. Further, in most instances, a system operator is only able to make one live announcement at a time, and if the message or instructions are to be repeated, the operator must remain at the system console and repeat the message in real-time. This leaves the operator unable to assist those responding to the emergency situation. Thus, a need exists for an emergency communication system that permits the communication of real-time, and not pre-recorded, messages to building occupants without requiring that one or more of the emergency responders be tasked with constant relaying of the messages to affected areas of the building.

SUMMARY OF THE INVENTION

According to one embodiment of the present invention there is provided an emergency communication system capable of distributing audible messages to a protected area located within a protected premises having at least one protected zone. The system generally comprises a processing element, a memory unit, and a speaker assembly associated with the processing element. The speaker assembly comprises a speaker circuit and one or more speakers being located within the protected zone. The processing element is operable to transmit a live, spoken message through the speaker circuit to the protected zone speakers, store the message in the memory unit, and cause the message to be repeated as a repeated message through the speaker assembly speakers.

According to another embodiment of the present invention there is provided an emergency communication system capable of distributing audible messages to a protected area comprising at least two protected zones. The system comprises a processing element operable to transmit a first live, spoken message through a first speaker assembly comprising a first speaker circuit and one or more speakers located within a first protected zone. The processing element is further operable to transmit a second live, spoken message through a second speaker assembly comprising a second speaker circuit and one or more speakers located within a second protected zone. The processing element is further operable to store the first and second messages in a memory unit and to cause the first message to be repeated through the first speaker assembly speakers as a first repeated message and the second message to be repeated through the second speaker assembly speakers as a second repeated message.

According to yet another embodiment of the present invention there is provided a non-transitory computer-readable storage medium with an executable program stored thereon for distributing audible messages to an area protected by an emergency communication system. The program instructs a processor to receive a live, spoken message, transmit the message through a speaker assembly comprising one or more speakers located in a protected zone within the protected area, and repeat the message as a recorded message through the protected zone speakers. Particularly, the program instructs the processor to record the message as it is being transmitted through the speaker assembly thereby enabling the repetition of the message subsequent to the initial live transmission. In another embodiment, the program also instructs the processor to receive a second live, spoken message, transmit the second message through a second speaker assembly comprising one or more speakers located in a second protected zone within the protected area, and repeat the second message as a second recorded message through the second protected zone speakers.

According to still another embodiment of the present invention there is provided a method for distributing audible messages to an area protected by an emergency communication system. The method comprises receiving a live, spoken message, transmitting the message through a speaker assembly comprising one or more speakers located in a protected zone within the protected area, and repeating the message as a recorded message through the protected zone speakers. In an additional embodiment, the method further comprises receiving a second live, spoken message, transmitting the second message through a second speaker assembly comprising one or more speakers located in a second protected zone within the protected area, and repeating the second message as a second recorded message through the second protected zone speakers.

DETAILED DESCRIPTION OF THE PREFERRED EMBODIMENT

Figure 1:
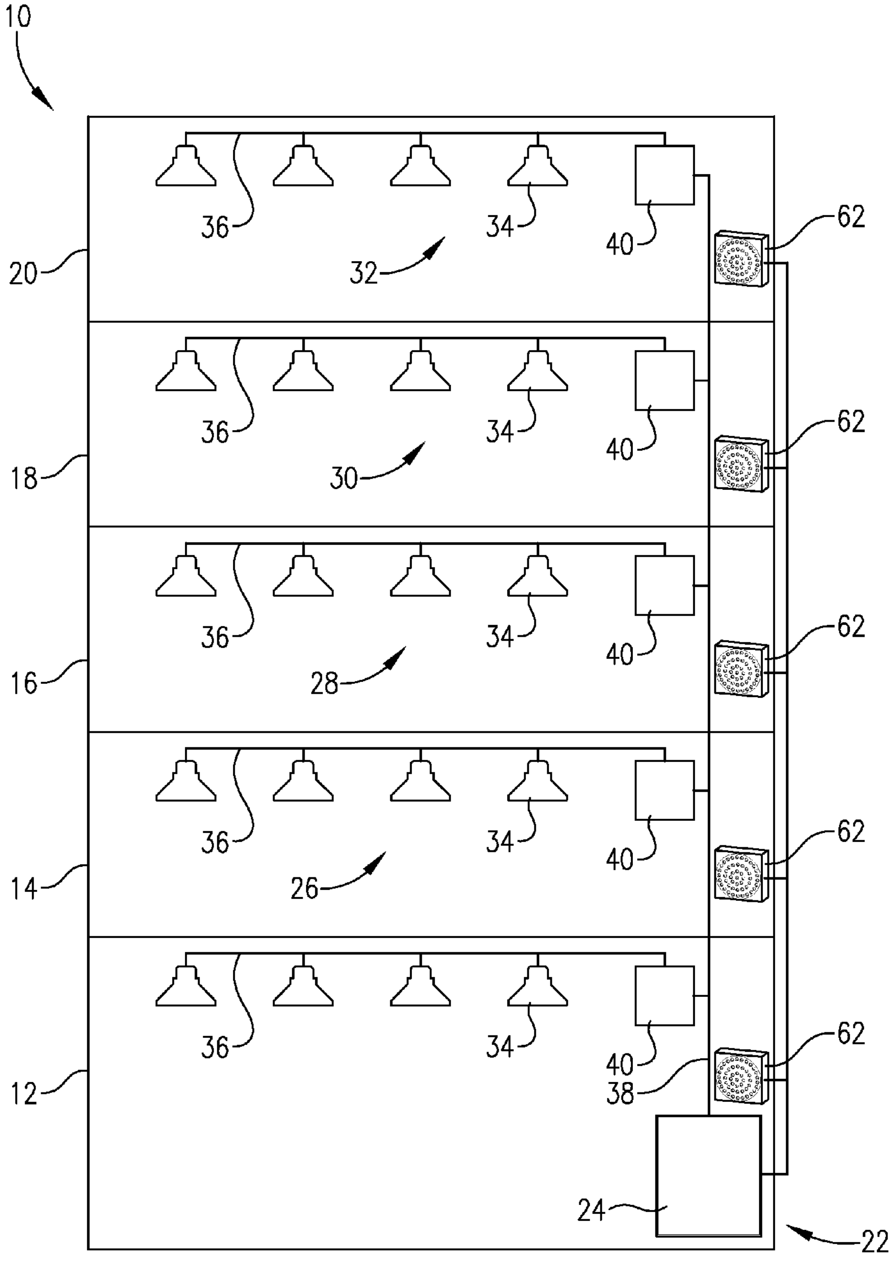
FIG. 1 is a schematic diagram of an emergency communication system in accordance with one embodiment of the present invention installed within a multi-level building.

As noted above, the present invention is generally directed toward an emergency communication system configured to be installed within a building or other protected areas and to deliver audible messages to one or more protected zones within the building or protected area. Turning to FIG. 1, a multi-level building 10 is illustrated comprising a plurality of floors 12, 14, 16, 18, and 20, at least a portion of each floor constitutes a protected zone. An emergency communication system 22 is shown installed within building 10. System 22 can take on any number of configurations as would be appropriate for a given structure, and such would be understood by one skilled in the art. Therefore, the embodiments illustrated in the Figures are exemplary and should not be taken as limiting the scope of the present invention.

System 22 comprises a command center 24 which includes a console having some kind of user interface to enable an operator to control the system. Note, even though command center 24 is shown as being located in the building's first level, command center 24 may be located anywhere in building 10 or even in a remote or off-site location. The user interface may take the form of a panel having a plurality of buttons or switches and include a audio input, such as a microphone or other type of handset, operable to receive the operator's voice input so that live messages may be broadcast through the system to all of or at least some portions of building 10. It is also within the scope of the present invention for the audio input to be located remote from command center 24, and even off site from building 10.

Included within system 22, and in certain embodiments within command center 24, is a processing element that controls the operation of system 22. The processing element may be any device, or combination of devices, equipped with a processor capable of implementing operator systems or executing a computer program, which is also generally known as instructions, commands, software code, executables, applications, apps, and the like. The processing element may include processors, microprocessors, microcontrollers, field-programmable gate arrays (FPGAs), or the like, as well as combinations thereof.

System 22 further comprises a memory element that is capable of storing or retaining any computer program utilized to control the processing element as well as data that is received by system 22, such as text, databases, graphics, audio, video, and combinations thereof. The memory element may also be known as a "computer-readable storage medium" and may include non-transitory components such as random access memory (RAM), read only memory (ROM), flash drive memory, hard disk drives, optical storage media such as compact discs (CDs or CDROMs), digital video disc (DVD), Blu-Ray™ or the like, as well as combinations thereof As described in greater detail below, the memory element may be a single memory unit associated with the processing element, or may comprise a plurality of memory elements distributed throughout system 22.

System 22 further comprises a plurality of speaker assemblies 26, 28, 30, 32 that are associated with, operably coupled to, or otherwise connected with the processing element. Each of the speaker assemblies comprise one or more speakers 34 installed within a particular floor or protected zone. Speakers 34 are interconnected with each other and associated with the processing element via a speaker circuit 36. In certain embodiments, the speaker circuits 36 are associated with the processing element via a communication path 38 that is dedicated for use only by said emergency communication system and is not shared by any other building systems. In particular embodiments, communication path 38 may be a wiring system, such as a dedicated two-wire system, or fiber optic cabling. However, in certain embodiments, it may be possible to utilize an internet protocol (IP) Ethernet or DSL communication systems as the communication path, even though such systems may not be dedicated for use only by the emergency communication system. Furthermore, even though communication path 38 is illustrated as a wired communication system, it is understood that communication path 38 may also comprise wireless technology, and that appropriate receiving and transmitting equipment be employed as a part of path 38.

Further distinguishing emergency communication systems according to the present invention from other types of communication or paging systems is that emergency communication systems may also include a back-up power source to permit operation of the system even though the building's main power source may be accidentally interrupted as a part of the emergency situation or intentionally interrupted in response to the emergency situation. In particular embodiments, this back-up power source should be capable of operating system 22 for at least 24 hours following disconnection of the building's primary AC power source. Emergency communication systems are generally supervised for system integrity from end to end so that any faults or malfunctions are immediately detected and can be rectified. Other paging systems for non-emergency use do not include this high level of supervision. Emergency communication systems are also constructed to permit operation of the system even through a ground fault. In certain embodiments, emergency communication systems have the capability of prioritizing the sending of signals through the system. For example, live messages are given priority over pre-recorded messages with respect of delivery to a particular protected zone. The use of dedicated signaling cables is important to this message prioritization aspect. Other communication systems which employ Ethernet technology do not prioritize the sending of signals through the system. Also, emergency communication systems can be integrated with a "failsafe" tone if cable or signal integrity is lost during an alarm event thus ensuring that the system will provide at least some type of alert to the building occupants even though the system is damaged or its functionality diminished. With an Ethernet-based system, the system is generally disabled by a loss of cable or signal integrity.

Speaker assemblies 26, 28, 30, and 32 may also comprise one or more amplifier units 40. The amplifier unit 40 for each respective speaker assembly may be located on the same floor as the speakers 36 for the respective speaker assembly, or the amplifier units may be housed in a common location such as the command center 24. In certain embodiments, however, it may be preferable for the amplifier units to be dispersed throughout building 10 as this may assist with the survivability of certain portions of system 22 should some other portions become damaged by an emergency situation, such as fire. As explained further below, the amplifier units 40 may be associated with memory elements comprising the aforementioned memory unit, so that messages intended for a particular zone or floor may be locally stored should other portions of system 22 become damaged and rendered non-functional.

Figure 2:
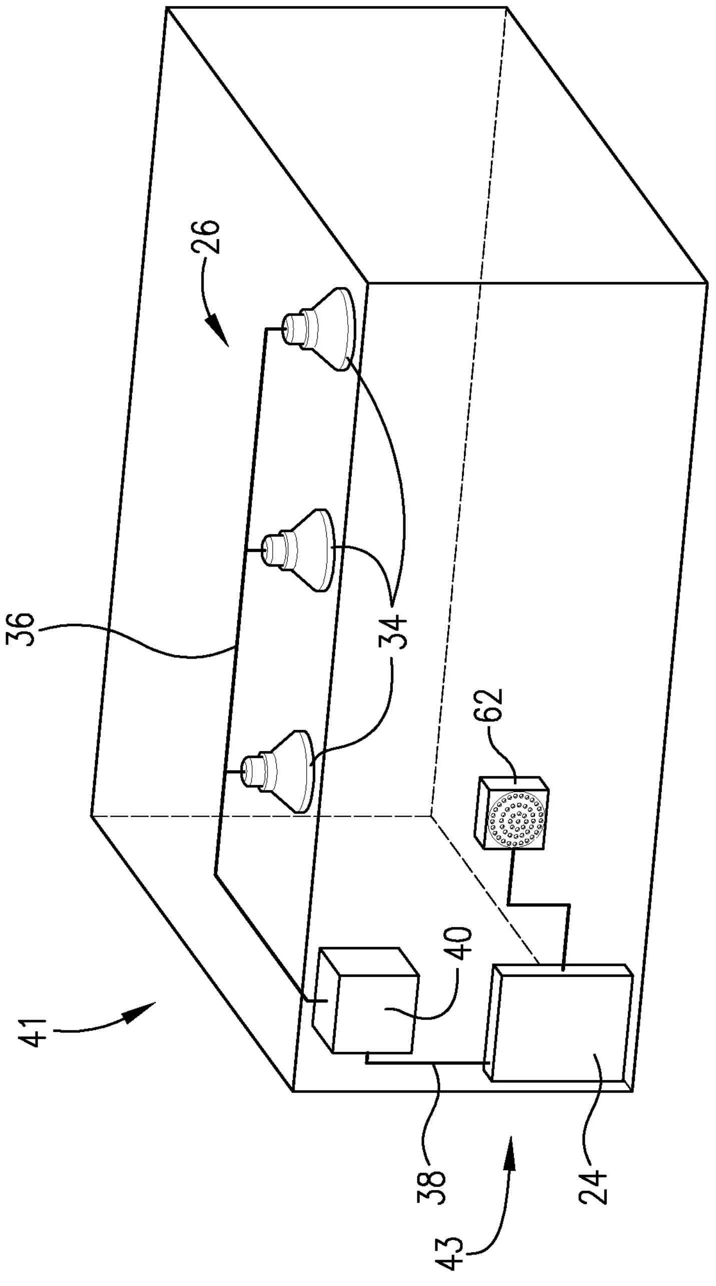
FIG. 2 is a schematic diagram of an emergency communication system in accordance with one embodiment of the present invention installed within a single protected space.

FIG. 2 illustrates an alternate embodiment according to the present invention in which a building 41 comprising a single protected zone. An emergency communication system 43 is installed within building 41. System 43 comprises a number of the same components and operational characteristics as system 22 described above. Namely a speaker assembly 26 comprising a plurality of speakers 34 is installed within the protected area within building 41. Speakers 34 are interconnected with each other and associated with a processing element located within a command center 24 via speaker circuit 36. Speaker circuit 36 may be associated with the processing element via a communication path 38 as previously described. System 43 is also shown as being equipped with an amplifier unit 40, although, it is within the scope of the present invention for amplifier unit 40 to be housed within command center 24.

Figure 3:
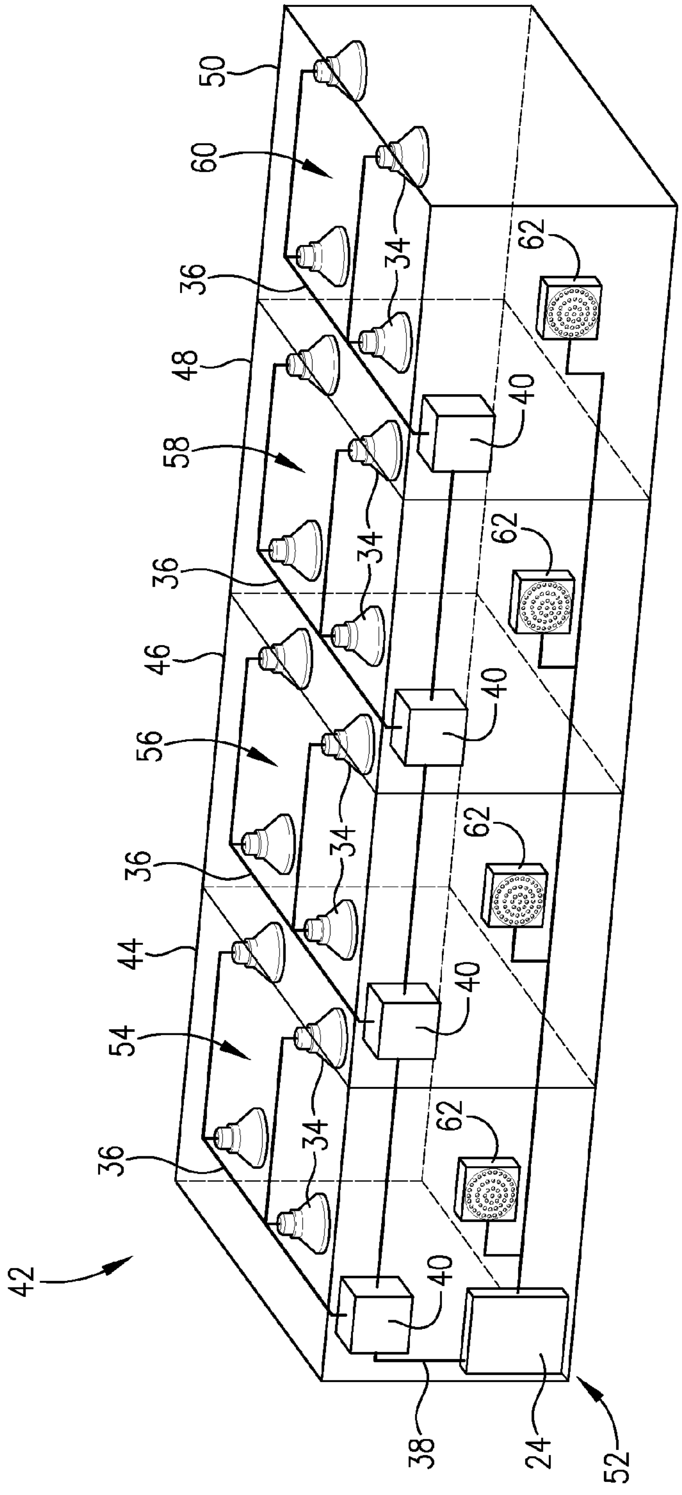
FIG. 3 is a schematic diagram of an emergency communication system in accordance with one embodiment of the present invention installed within a single-level building having a plurality of discrete zones protected by the system.

FIG. 3 illustrates an alternate embodiment of the present invention in which the communication system is installed within a building 42 having multiple protected zones on the same level. Although building 42 is illustrated as comprising a single level, it should be noted that the concepts of this embodiment are equally applicable for multi-level buildings such as building 10 of FIG. 1 having individual floors comprising multiple protected zones.

Building 42 includes a plurality of protected zones 44, 46, 48, 50. A communication system 52, similar in configuration to communication system 22 of FIG. 1, is installed within building 42. A command center 24 is shown installed within protected zone 44, although, it is within the scope of the present invention for command center to be situated in a different portion of building 42 or at a remote site. Command center 24 is shown associated with a plurality of speaker assemblies 54, 56, 58, 60 installed within a respective protected zone. In all other respects, the speaker assemblies of FIG. 3 are similar to those of FIG. 1 in that they each comprise one or more speakers 34 interconnected by a speaker circuit 36, and in certain embodiments an amplifier unit 40. Also, speaker circuits 36 are associated with a processing element, such as may be found in command center 24, by a dedicated communication path 38.

As discussed further with respect to the operation of communication systems 22, 43, and 52, the systems are equipped with one or more audio input devices 62. Audio input devices 62 may comprise any type of communication source capable of receiving an audio signal including, but not limited to a fireman's phone or other type of microphone. Typically, one audio input device 62 is associated with or in close proximity to the command center 24, although, it is within the scope of the present invention for additional input devices 62 to be located throughout buildings 10, 42 and in particular in each protected zone or floor. Further, each of input devices 62 remote from command center 24 may be associated with a secondary control panel (not illustrated) which may be of similar functionality as command center 24, but possibly more limited in terms of system-wide access. Additionally, systems 22, 43, and 52 may also include other peripheral apparatus installed within buildings 10, 42 such as pull stations, smoke detectors, heat detectors, gas detectors, video systems, emergency communication and notification devices.

In the event of an emergency situation within the protected area, such as building 10, 41, or 42, the emergency communication system 22, 43, 52 is functional to permit responding personnel to deliver real-time customized messages to particular protected zones within the protected area, and then cause those messages to be automatically repeated in the particular zones to which they were originally delivered in real-time. This automatic recording of the live message as it is being delivered to the protected zone and its repetition permits the responder to speak the message a single time and then be able to assist with addressing the emergency situation, instead of having to repeat the message live.

The operation of emergency communication systems according to the present invention will be described with particular reference to system 22 of FIG. 1. However, it is noted that the operation of systems 43 and 52 are essentially similar, with exception that system 43 is configured to protect a single zone. Therefore, the following discussion should be viewed as being applicable for systems 43 and 52 and not limiting in any way on the scope of the present invention. An emergency situation, such as a fire, might initiate emergency communication system 22 to deliver a pre-recorded voice message to occupants within building 10, 42 alerting them to the situation. Upon arrival, responding personnel, such as firefighters, may determine that the pre-recorded message is not appropriate for certain portions of the building, or they may wish to deliver specific instructions to certain occupants of the building. For example, in the event of a fire on floor 20, the emergency responders may wish to advise occupants of floor 20 to exit the floor via a particular escape route. In order to accomplish the evacuation of floor 20 in the most expedient manner, the responders may want the occupants of floors 14 and 16 to remain in place so as to avoid overcrowding of the escape route or direct the occupants of those floors to evacuate through an alternate escape route. The functionality of system 22 permits the emergency responders to deliver a first, live message to the occupants of floor 20, and cause that same message to be repeated a plurality of times. Once the first live message has been delivered, the emergency responders may transmit a second live message to the occupants of floors 14 and 16 with an alternate set of instructions and cause that second message to be repeated a plurality of times.

In order to accomplish this mission, the processing element utilized by system 22 must be operable to transmit a first live, spoken message through speaker assembly 32 located on floor 20, store that message within the memory unit, such as within a memory element comprising amplifier unit 40 associated with speaker assembly 32, and cause the message to be repeated through said speakers 34 of speaker assembly 32. The processing element must also be operable to transmit a second live, spoken message through speaker assembly 26, for example, located on floor 14, store that second message within the memory unit, such as within a memory element comprising amplifier unit 40 associated with speaker assembly 26, and cause the message to be repeated through speakers 34 of speaker assembly 26.

In another aspect, the present invention is also directed toward a non-transitory computer-readable storage medium with an executable program stored thereon and method for distributing audible messages to an area protected by the emergency communication system 22. The computer program and the method may be implemented in hardware, software, firmware, or combinations thereof. In keeping with the above illustration, the computer program instructs the aforementioned processor to receive a first live, spoken message which may be delivered by an emergency responder via one of input devices 62, transmit the first message through speaker assembly 32 which includes one or more speakers 34 located on floor 20, and repeat the first message as a first recorded message through the same speakers 34. The computer program further instructs the processor to receive a second live, spoken message which may delivered by an emergency responder via the same input device 62 which delivered the first message or through a different input device located in building 10. The program instructs the processor to transmit the second message through speakers 34 of speaker assembly 26 located on floor 14, and then repeat the second message as a second recorded message through the speakers 34 of assembly 26.

In certain embodiments, the computer program also instructs the processor to store the first message in a first memory element such as might be found in amplifier unit 40 that is associated with speaker assembly 32, and store the second message in a second memory element such as might be found in amplifier unit 40 that is associated with speaker assembly 26. As noted above, the first and second messages may comprise individualized instructions for the occupants of each floor. Further, the computer program may also instruct the processor to repeat each stored message a plurality of times, for instance until the emergency situation has been abated and the system operator cancels the messages.

In certain embodiments, system 22 includes the functionality to permit any pre-recorded messages initiated by detection of the emergency condition to continue to repeat on floors where live, customized messages were not directed. Thus, system 22 permits the simultaneous broadcast of live, real-time messages, repeats of those live messages, and pre-recorded messages throughout various portions of building 10. Further, system 22 permits prioritization of messages so that live broadcast messages preempt pre-recorded messages.

Although the operation of system 22 has been illustrated by the foregoing example, such example should not be viewed as limiting on the scope of the present invention. Further, it can be appreciated that system 43 illustrated in FIG. 2 and system 52 illustrated in FIG. 32, may be operated in a similar manner with the exception that the messages are delivered to the lone protected zone, as in system 43, or to individual protected zones 44, 46, 48, 50, instead of floors 12, 14, 16, 18, 20, as in system 52.

We claim:

1. An emergency communication system capable of distributing audible messages to a protected area comprising at least one protected zone, said system comprising:

a processing element and a memory unit;

a first speaker assembly associated with said processing element, said first speaker assembly comprising a first speaker circuit and one or more speakers being located within a first protected zone;

a second speaker assembly associated with said processing element, said second speaker assembly comprising a second speaker circuit and one or more speakers located within a second protected zone; and at least one peripheral device installed within said each of said first and second protected zones selected from the group consisting of an alarm pull station, a smoke detector, a heat detector, and a gas detector, said processing element configured to automatically transmit a pre-recorded voice message from the memory unit to said first protected zone speakers upon the at least one peripheral device alerting the processing element of an emergency situation, said processing element operable to preempt said pre-recorded voice message based on detecting a first live, spoken message received in response to said peripheral device alerting the processing element of said emergency situation and transmit said first live, spoken message through said first speaker circuit to said first protected zone speakers, store said first live, spoken message in said memory unit as it is being transmitted through said first speaker circuit, and cause said first live, spoken message to be repeated a plurality of times as a first repeated message through said first speaker assembly speakers, said processing element operable to transmit a second live, spoken message through said second speaker circuit to said second protected zone, store said second message in said memory unit as it is being transmitted through said second speaker circuit, and cause said second message to be repeated a plurality of times as a second repeated message through said second speaker assembly speakers simultaneously while said first repeated message is repeated through said first speaker assembly wherein said second repeated message is transmitted based on detecting said second live, spoken message and based on a detection by said processor element that said first repeated message has been transmitted through said first speaker assembly speakers.

2. The emergency communication system according to claim 1, wherein said first speaker assembly comprises a first amplifier unit, and said second speaker assembly comprises a second amplifier unit.

3. The emergency communication system according to claim 2, wherein said memory unit comprises a first memory element associated with said first amplifier unit and a second memory element associated with said second amplifier unit, said first memory element being operable to store said first message, and said second memory element being operable to store said second message.

4. The emergency communication system according to claim 1, wherein said processing element is associated with an operating console.

5. The emergency communication system according to claim 1, wherein said protected area is located within a protected premises, said first protected zone comprising at least a portion of one floor of said protected premises, said second protected zone comprising at least a portion of one other floor of said protected premises.

6. The emergency communication system according to claim 1, wherein said first and second speaker assemblies are associated with said processing element via a communication path dedicated for use only by said emergency communication system.

7. The emergency communication system according to claim 1, wherein said emergency communication system includes a backup power supply unit capable of operating said system for at least 24 hours following disconnection of the system from a primary power source.

8. A non-transitory computer-readable storage medium with an executable program stored thereon for distributing audible messages to an area protected by an emergency communication system, wherein the program instructs a processor to perform the steps of automatically transmitting a pre-recorded voice message to one or more first protected zone speakers of a first speaker assembly upon at least one peripheral device alerting the processor of an emergency situation, said at least one peripheral device selected from the group consisting of an alarm pull station, a smoke detector, a heat detector, and a gas detector, said at least one peripheral device and said first protected zone speakers being located within a first protected zone within said protected area;

receiving a first live, spoken message preempting said pre-recorded voice message based on detecting said first live, spoken message received in response to said peripheral device alerting the processor of said emergency situation;

transmitting said first live, spoken message through said first speaker assembly of said emergency communication system comprising said one or more first protected zone speakers storing said first message as it is being transmitted through said first speaker assembly;

repeating said stored first live, spoken message as a stored first message a plurality of times as a first recorded message through said first protected zone speakers; receiving a second live, spoken message;

transmitting said second live, spoken message through a second speaker assembly of said emergency communication system comprising one ore more second protected zone speakers located in a second protected zone within said protected area;

storing said second live, spoken message as a stored second message as it is being transmitted through said second speaker assembly; and repeating said store second message as a second recorded message through said second protected zone speakers simultaneously while said first recorded message is repeated through said first speaker assembly, wherein said second recorded message is transmitted based on detecting said second live, spoken message and based on a detection by said processor that said first recorded message has been transmitted through said first protected zone speakers.

9. The computer-readable storage medium according to claim 8, wherein said protected area is located within a protected premises, said first protected zone comprising at least a portion of one floor of said protected premises, said second protected zone comprising at least a portion of one other floor of said protected premises.

10. The computer-readable storage medium according to claim 8, wherein said program further instructs said processor to repeat said second message a plurality of times.

11. The computer-readable storage medium according to claim 8, wherein first and second speaker assemblies comprise first and second amplifier units, respectively, and wherein said program instructs said processor to store said first message in a first memory element of said first amplifier unit and said second message in a second memory element of said second amplifier unit.

12. The computer-readable storage medium according to claim 8, wherein said first and second speaker assemblies are associated with said processing element via a communications path dedicated for use only by said emergency communication system.

13. The computer-readable storage medium according to claim 8, wherein said first and second messages comprise emergency instructions for occupants located within said first and second protected zones, respectively.

14. A method for distributing audible messages to an area protected by an emergency communication system comprising:

receiving a first live, spoken message;

preempting a pre-recorded voice message and transmitting said first live, spoken message through a first speaker assembly of said emergency communication system based on detecting said first live, spoken message received in response to at least one peripheral device alerting a processor of said emergency situation, said first speaker assembly comprising one or more speakers located in a first protected zone within said protected area, said at least one peripheral device installed within said first protected zone and selected from the group consisting of an alarm pull station, a smoke detector, a heat detector, and a gas detector;

storing said first live, spoken message as a stored first message as it is being transmitted through said first speaker assembly;

repeating said stored first message a plurality of times as a first recorded message through said first protected zone speakers; receiving a second live, spoken message;

transmitting said second live, spoken message through a second speaker assembly of said emergency communication system comprising one or more speakers located in a second protected zone within said protected area;

storing said second live, spoken message as a stored second message as it is being transmitted through said second speaker assembly; and repeating said stored second message as a second recorded message through said second protected zone speakers;

wherein said second recorded message is transmitted based on detecting said second live, spoken message and based on detecting that said first recorded message has been transmitted through said first protected zone speakers.

15. The method according to claim 14, wherein said protected area is located within a protected premises, said first protected zone comprising at least a portion of one floor of said protected premises, said second protected zone comprising at least a portion of one other floor of said protected premises.

16. The method according to claim 14, wherein said second message is repeated through said second speaker assembly speakers a plurality of times.

17. The method according to claim 14, wherein first and second speaker assemblies comprise first and second amplifier units, respectively, and wherein said first message is stored in a first memory element of said first amplifier unit, and said second message is stored in a second memory element of said second amplifier unit.

18. The method according to claim 14, wherein said first and second speaker assemblies are associated with said processing element via a communications path dedicated for use only by said emergency communication system.

19. The method according to claim 14, wherein said first and second messages comprise emergency instructions for occupants located within said first and second protected zones, respectively.

* * * * *

UNITED STATES PATENT AND TRADEMARK OFFICE

CERTIFICATE OF CORRECTION

PATENT NO. : 9,147,325 B2
APPLICATION NO. : 13/536518
DATED : September 29, 2015
INVENTOR(S) : Vishal Agrawal et al.

It is certified that error appears in the above-identified patent and that said Letters Patent is hereby corrected as shown below:

ON THE TITLE PAGE

Item 73 should read

Assignee: Fike Corporation, Blue Springs, MO (US)

Signed and Sealed this
Twenty-third Day of February, 2016

Michelle K. Lee

Michelle K. Lee
*Director of the United States Patent and Trademark Office*